US012669361B2

(12) United States Patent
Wegmann et al.

(10) Patent No.: US 12,669,361 B2
(45) Date of Patent: Jun. 30, 2026

(54) CONFIGURABLE CONTROL OF UNLOADING RATE BASED ON FILL HEIGHT

(71) Applicant: Deere & Company, Moline, IL (US)

(72) Inventors: Riley J. Wegmann, Urbana, IA (US); Daniel M. Solano, Monterrey (MX); Edson Enrique Castañeda Mancillas, Monterrey (MX)

(73) Assignee: Deere & Company, Moline, IL (US)

( * ) Notice: Subject to any disclaimer, the term of this patent is extended or adjusted under 35 U.S.C. 154(b) by 150 days.

(21) Appl. No.: 18/634,084

(22) Filed: Apr. 12, 2024

(65) Prior Publication Data

US 2025/0321131 A1     Oct. 16, 2025

(51) Int. Cl.
| | |
|---|---|
| *G01F 11/28* | (2006.01) |
| *A01D 34/00* | (2006.01) |
| *A01D 43/077* | (2006.01) |
| *G01F 13/00* | (2006.01) |
| *G01F 15/063* | (2022.01) |

(52) U.S. Cl.
CPC .......... *G01F 11/282* (2013.01); *A01D 34/008* (2013.01); *A01D 43/077* (2013.01); *G01F 13/005* (2013.01); *G01F 15/063* (2013.01)

(58) Field of Classification Search
CPC .... G01F 11/282; G01F 13/005; G01F 15/063; A01D 34/008; A01D 43/077
See application file for complete search history.

(56) References Cited

U.S. PATENT DOCUMENTS

| | | | |
|---|---|---|---|
| 8,032,255 | B2 | 10/2011 | Phelan et al. |
| 8,126,620 | B2 | 2/2012 | Ringwald et al. |
| 8,380,401 | B2 | 2/2013 | Pighi et al. |
| 8,626,406 | B2 | 1/2014 | Schleicher et al. |
| 8,662,972 | B2 | 3/2014 | Behnke et al. |
| 8,868,304 | B2 | 10/2014 | Bonefas |
| 9,043,096 | B2 | 5/2015 | Zielke et al. |
| 9,049,817 | B2 | 6/2015 | McCully et al. |
| 9,119,342 | B2 | 9/2015 | Bonefas |
| 9,169,032 | B2 | 10/2015 | Gengerke |
| 9,185,845 | B2 | 11/2015 | Van Mill et al. |

(Continued)

FOREIGN PATENT DOCUMENTS

| | | | |
|---|---|---|---|
| CA | 2791436 | A1 | 4/2014 |
| DE | 102019202950 | A1 | 9/2019 |

(Continued)

OTHER PUBLICATIONS

1950 Dual Auger Grain Cart—Killbros Farm Equipment, retrieved from https://web.archive.org/web/20160203214035/https://www.killbrosequip.com/grain-carts/1950/, 2016, 8 pages.

(Continued)

*Primary Examiner* — Donnell A Long
(74) *Attorney, Agent, or Firm* — Christopher J. Volkmann; KELLY, HOLT & CHRISTENSON PLLC

(57) ABSTRACT

A material transfer vehicle transfers material to a container. A level of material in the container is detected, and a transfer rate of material from the material transfer vehicle to the container is controlled based upon the detected fill level. The transfer rate can be controlled using a plurality of different configurable unload parameters.

20 Claims, 10 Drawing Sheets

(56) References Cited

U.S. PATENT DOCUMENTS

| | | |
|---|---|---|
| 9,187,259 B2 | 11/2015 | Van Mill et al. |
| 9,272,853 B2 | 3/2016 | Van Mill et al. |
| 9,392,746 B2 | 7/2016 | Darr et al. |
| 9,457,971 B2 | 10/2016 | Bonefas et al. |
| 9,529,364 B2 | 12/2016 | Foster et al. |
| 9,545,048 B2 | 1/2017 | Pickett et al. |
| 9,596,805 B2 | 3/2017 | Van Mill et al. |
| 9,596,809 B2 | 3/2017 | Van Mill et al. |
| 9,615,509 B2 | 4/2017 | Flickinger et al. |
| 9,642,305 B2 | 5/2017 | Nykamp et al. |
| 9,763,389 B2 | 9/2017 | Bump et al. |
| 9,820,436 B2 | 11/2017 | Inoue et al. |
| 9,861,040 B2 | 1/2018 | Bonefas |
| 9,873,570 B2 | 1/2018 | Van Mill et al. |
| 10,019,790 B2 | 7/2018 | Bonefas et al. |
| 10,028,434 B2 | 7/2018 | Van Mill et al. |
| 10,028,441 B2 | 7/2018 | Van Mill et al. |
| 10,028,442 B1 | 7/2018 | Crosby |
| 10,106,333 B2 | 10/2018 | Beaujot et al. |
| 10,278,328 B2 | 5/2019 | Thomson et al. |
| 10,292,327 B2 | 5/2019 | Ducroquet et al. |
| 10,351,364 B2 | 7/2019 | Green et al. |
| 10,406,961 B2 | 9/2019 | Grodecki et al. |
| 10,760,946 B2 | 9/2020 | Meier et al. |
| 10,765,063 B2 | 9/2020 | Van Mill et al. |
| 10,807,812 B2 | 10/2020 | Thomson et al. |
| 11,008,177 B2 | 5/2021 | Banthia et al. |
| 11,457,562 B2 | 10/2022 | Van Mill et al. |
| 11,659,788 B2 | 5/2023 | Puryk et al. |
| 11,825,765 B2 | 11/2023 | Van Mill et al. |
| 2009/0321154 A1 | 12/2009 | Johnson |
| 2009/0325658 A1* | 12/2009 | Phelan ............... A01D 41/1275 |
| | | 460/6 |
| 2011/0220677 A1 | 9/2011 | Bertolani |
| 2021/0294337 A1 | 9/2021 | Van Mill et al. |
| 2022/0071078 A1 | 3/2022 | Boyer et al. |
| 2022/0408641 A1 | 12/2022 | Van Mill et al. |
| 2023/0180659 A1 | 6/2023 | Grieshop et al. |
| 2024/0049635 A1* | 2/2024 | Vandike ............... A01D 41/127 |
| 2024/0130278 A1* | 4/2024 | Waldo .................... A01D 90/10 |

FOREIGN PATENT DOCUMENTS

| | | | |
|---|---|---|---|
| DE | 102023103594 A1 | 9/2023 | |
| DE | 102024123283 A1 | 4/2025 | |
| EP | 0728664 A1 * | 8/1996 | ........... A47J 31/404 |
| GB | 1104906 A | 3/1968 | |
| WO | 2018102524 A1 | 6/2018 | |
| WO | 2023150219 A1 | 8/2023 | |

OTHER PUBLICATIONS

German Search Report issued in application No. 102025102042.6 dated Jan. 5, 2026, 10 pages.

\* cited by examiner

CONFIGURABLE CONTROL OF UNLOADING RATE BASED ON FILL HEIGHT

FIELD OF THE DESCRIPTION

The present description relates to agricultural equipment. More specifically, the present description relates to using configurable control of an unloading rate based on a fill height.

BACKGROUND

There is a wide variety of different types of agricultural equipment. Some such agricultural equipment includes agricultural harvesters. Agricultural harvesters often engage crop and process that crop, and unload that crop into a material transfer vehicle, such as a tractor-pulled grain cart (for example).

Once the grain cart is filled by a harvester to a desired fill level, a propulsion vehicle (such as a tractor or other vehicle) pulls the grain cart to transfer the harvested material to a container, such as a semi-trailer. The propulsion vehicle approaches the semi-trailer, positions an unloading spout or auger, pulls alongside the semi-trailer, and then engages the unloading auger on the grain cart to unload the harvested material from the grain cart into the semi-trailer.

The discussion above is merely provided for general background information and is not intended to be used as an aid in determining the scope of the claimed subject matter.

SUMMARY

A material transfer vehicle transfers material to a container. A level of material in the container is detected, and a transfer rate of material from the material transfer vehicle to the container is controlled based upon the detected fill level. The transfer rate can be controlled using a plurality of different configurable unload parameters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
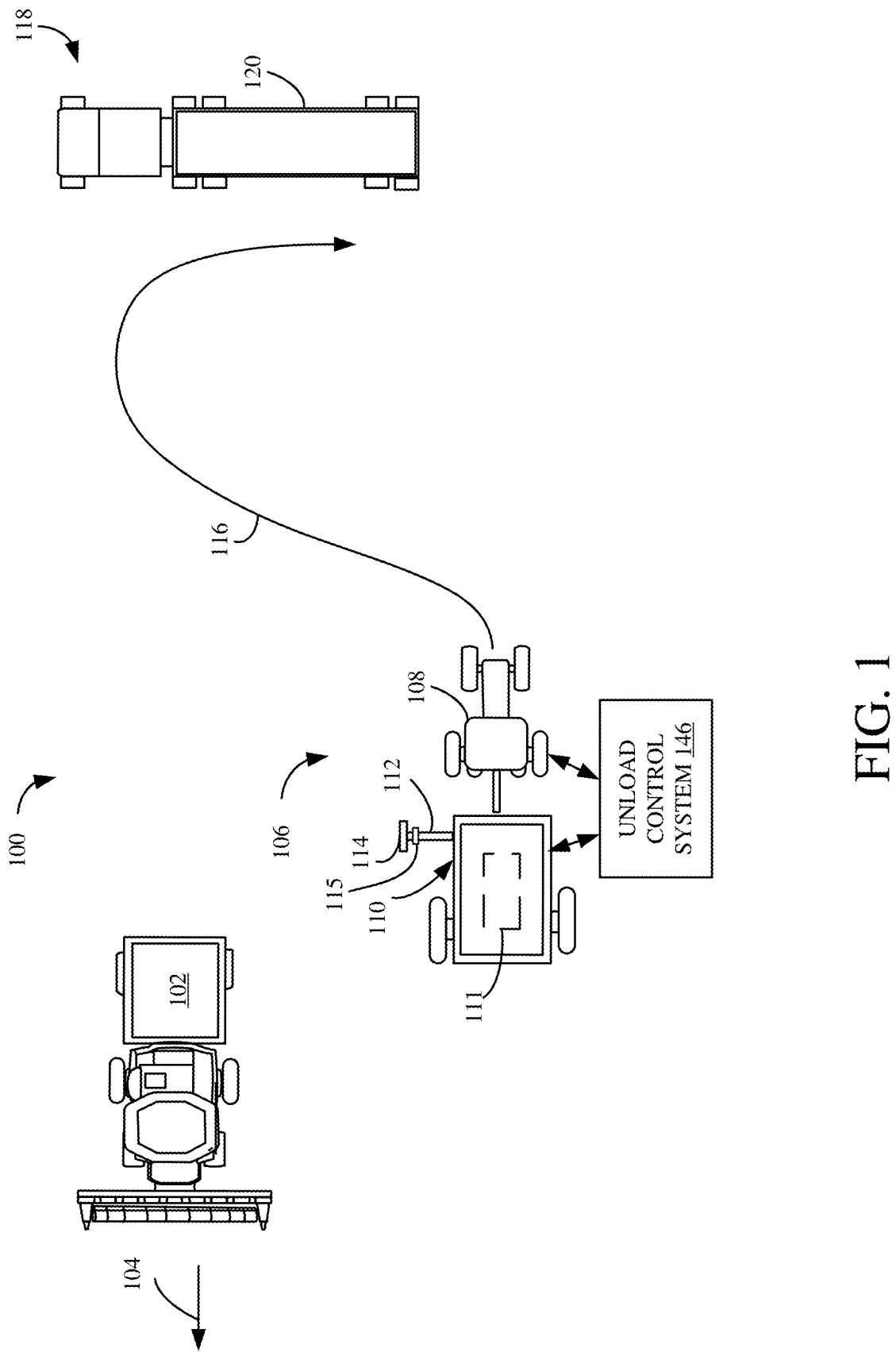
FIG. 1 is a partial pictorial, partial block diagram of one example of an agricultural system.

As discussed above, it is not uncommon for a material transfer vehicle to transport material (such as grain or other material) to a container, such as a semi-trailer. The material transfer vehicle then unloads the material into the semi-trailer, often at a high rate of speed. For instance, automated unloading of grain carts takes place at a rate that is often in excess of several hundred bushels per minute. The material transfer vehicle may begin loading the semi-trailer at one end of the semi-trailer and then intermittently move along the semi-trailer to fill the semi-trailer to a desired fill level along the entire length of the semi-trailer. The unloading operation may be performed according to a desired fill pattern (e.g., a front-to-back fill pattern, a back-to-front fill pattern, a multi-pass fill pattern, etc.).

In order to perform the unloading operation, the material transfer vehicle normally fills a first portion of the semi-trailer to a desired fill level and then moves to a next subsequent position along the semi-trailer and fills that next subsequent position to the desired fill level, and so on, until either all of the material is transferred from the material transfer vehicle, or until the semi-trailer is filled to a desired fill level along its length. This process can also be automated. In an automated unloading operation, the material transfer vehicle is positioned to load material into the semi-trailer at a first landing point. A sensor, such as an optical sensor with image processing functionality, captures an image of the material in the semi-trailer during unloading and generates an output indicative of the height or fill level of material in the semi-trailer at that landing point. When the fill level reaches a desired level, then the material transfer vehicle moves so that material is transferred to a new landing point within the semi-trailer. However, when material is being transferred at a high rate, it can be difficult or react quickly enough to avoid spillage. For instance, if can be difficult to detect that the fill level of material has reached its desired fill level and then move the material transfer vehicle to a new landing point quickly enough to avoid over-filling the semi-trailer at the first landing point.

Therefore, the present description describes a system in which the material unloading rate at which material is transferred from the material transfer vehicle to the container is controlled based upon the fill level of material in the container. As the fill level approaches a desired fill level, the unloading rate is tapered until the fill level is within a cutoff threshold of the desired fill level, at which point the commanded unloading rate is set to zero. Also, in one example, the unloading rate is controlled, based upon the detected fill level in the container, according to a plurality of configurable control parameters. Those control parameters can be configured automatically, or manually, or in other ways (such as using machine learning, empirical techniques, etc.). The unloading control parameters may include such things as the taper fill level threshold (the fill level at which tapering begins), the cutoff threshold (the fill level at which the transfer rate is set to zero), the desired fill level, and the rate at which tapering is to be performed.

FIG. 1 is a partial pictorial, partial block diagram of one example of an agricultural system 100 in which a harvester 102 is moving through a field in a direction indicated by arrow 104. A material transfer vehicle 106 includes a propulsion vehicle (e.g., a tractor) 108 and a grain cart 110.

Grain cart 110 is shown having an auger 112 and a spout 114 that are used to unload harvested material from grain cart 110. In the example shown in FIG. 1, grain cart 110 has been filled with harvested material from harvester 102 and is traveling along a travel path indicated by arrow 116 toward a container (e.g., a semi-truck) 118. In order to unload material from grain cart 110, tractor 108 pulls the grain cart 110 alongside of semi-trailer 120 so that the auger 112 can be engaged to transfer material from grain cart 110 into semi-trailer 120. In one example, the auger 112 is driven by a power takeoff on tractor 108.

Grain cart 110 is also shown with a gate 111 disposed in a lower portion of grain cart 110. When material is transferred from grain cart 110 to semi-trailer 120, gate 111 is partially or fully opened to allow material in grain cart 110 to fall to a lower area, or hopper, where it can be moved by auger 112. Therefore, the rate at which material is unloaded from grain cart 110 into semi-trailer 120 is based on the extent to which gate 111 is opened, and also based upon the speed of auger 112 (e.g., the speed of the power takeoff of auger 112, or other mechanisms that are used to drive auger 112).

Also, in the example shown in FIG. 1, agricultural system 100 includes unload control system 146. Unload control system 146 can be deployed on tractor 108, grain cart 110, or in a remote server environment, or disposed among a plurality of different locations. Unload control system 146, as described in greater detail below, controls different subsystems on material transfer vehicle 106 to automatically unload material from grain cart 110 into semi-trailer 120. In one example, unload control system 146 receives an input from sensor 115 which may be mounted on auger 112 or elsewhere, and which generates an output indicative of a fill level of material in semi-trailer 120. For instance, sensor 115 may be a mono or stereo camera mounted on auger 112 that captures an image of the inside of semi-trailer 120 when grain cart 110 is unloading material into semi-trailer 120. Based upon the captured image, unload control system 146 can detect the fill level of material in semi-trailer 120. Based upon that fill level, unload control system 146 can control one or more different controllable subsystems on material transfer vehicle 106 in order to control the rate at which material is transferred from grain cart 110 into semi-trailer 120. In one example, the rate is tapered as the fill level in semi-trailer 120 approaches the desired fill level, which gives material transfer vehicle 106 time to move to a new unloading point to avoid over-filling semi-trailer 120.

Figure 2:
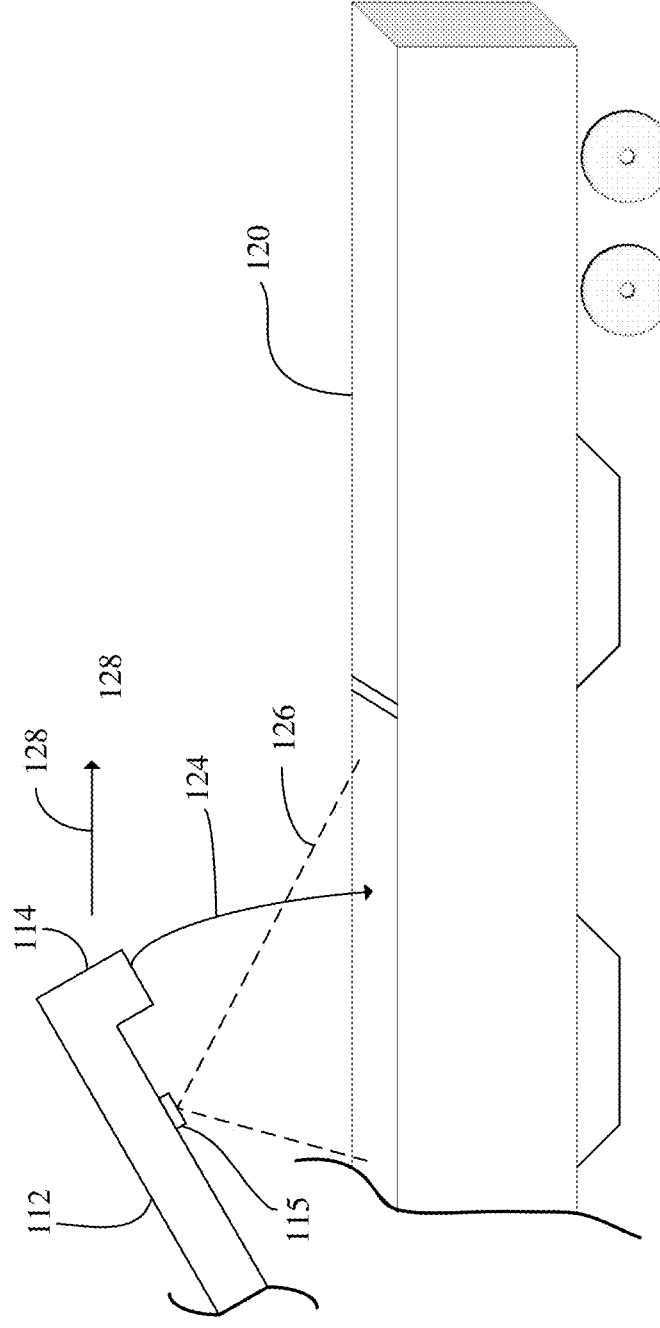
FIG. 2 is a pictorial illustration of one example of a portion of the agricultural system during an unloading operation.

FIG. 2 shows one example of a semi-trailer 120 in which auger 112 is positioned at a position so that material exiting spout 114 will land at a landing point in semi-trailer 120 generally identified by arrow 124. Detector 115 may, for instance, be an optical detector, such as a mono or stereo camera that has a field of view 126 of the interior of semi-trailer 120 generally in the area of the landing point of the material exiting spout 114. In one example, when unload control system 146 determines that the material within semi-trailer 120 is at a desired fill level, then material transfer vehicle 106 will move alongside trailer 120 so that spout 114 travels in the direction generally indicated by arrow 128 so the material lands at a next subsequent landing point in the semi-trailer 120. This continues until semi-trailer 120 is filled to a desired fill level, or until material transfer vehicle 106 has transferred all of its material into semi-trailer 120.

As discussed above, it can be difficult for detector 115 to detect that the fill level of material inside semi-trailer 120 is at a desired fill level in sufficient time to allow material transfer vehicle 105 to move in the direction indicated by arrow 128 to avoid spillage of material over the sides of semi-trailer 120, because of the high rate at which material is transferred. Therefore, in one example, unload control system 146 begins tapering the unloading rate of material, as the fill level of material inside semi-trailer 120 increases beyond a taper threshold level. Then, once the fill level of material in semi-trailer 120 reaches a cutoff threshold, unload control system 146 commands the subsystems on material transfer vehicle 106 to stop transferring material. Such commands can include closing gate 111, stopping auger 112, etc. Because of the latency in controlling gate 111 and/or auger 112, the cutoff threshold may be set below the desired fill level. This provides sufficient time to stop the flow of material into semi-trailer 120 without exceeding the desired fill level. Of course, the cutoff threshold can be set in other ways as well.

Figure 3:
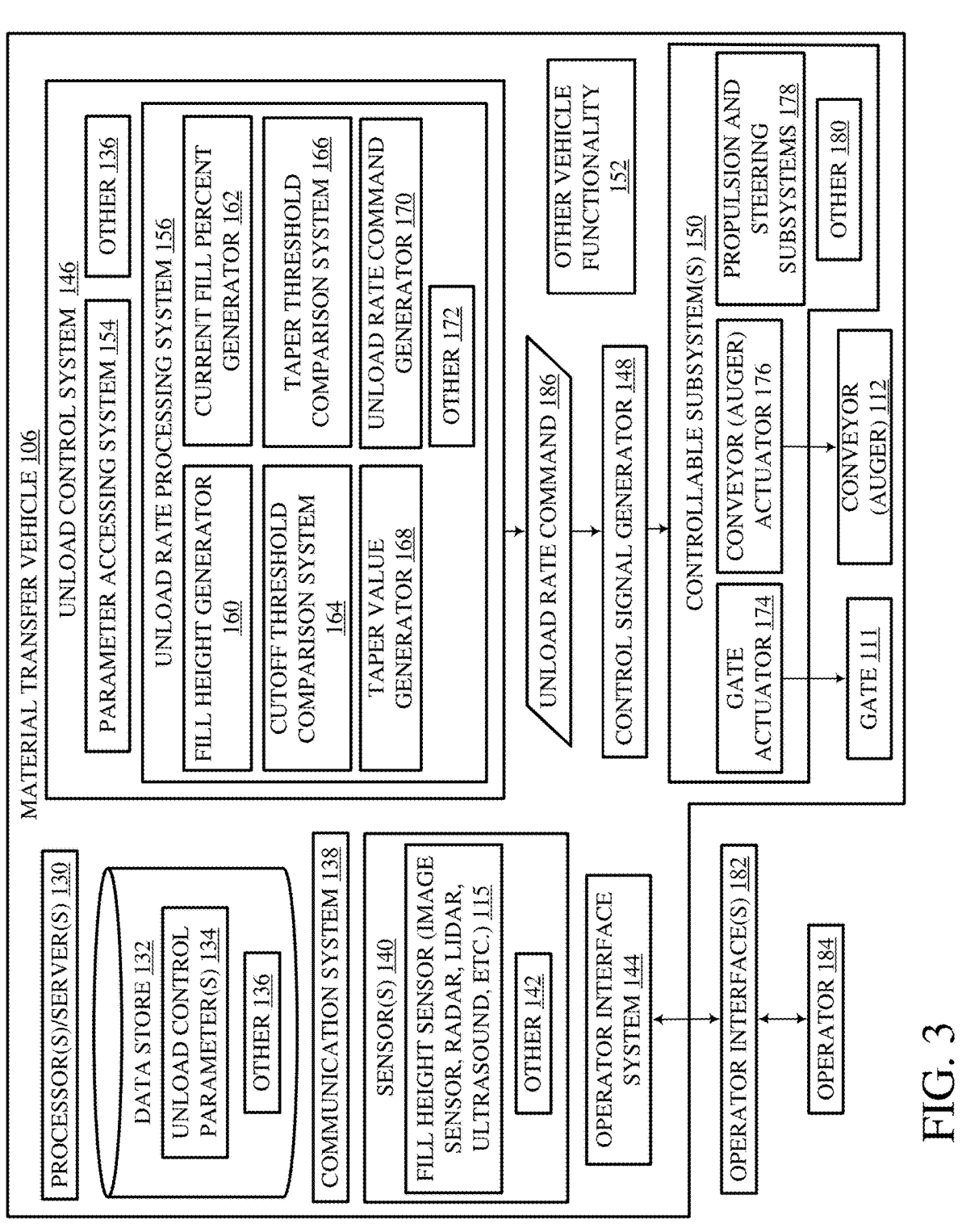
FIG. 3 is a block diagram showing one example of a material transfer vehicle in more detail.

FIG. 3 is a block diagram showing one example of material transfer vehicle 106, with some parts shown in more detail. In the example shown in FIG. 3, material transfer vehicle 106 includes one or more processors or servers 130, data store 132 (which can include unload control parameters 134 and other items 136), communication system 138, sensors 140 (which can include fill height sensor 115 and other sensors 142), operator interface system 144, unload control system 146, control signal generator 148, controllable subsystems 150, and other functionality 152. In one example, unload control system 146 can include parameter accessing system 154, unload rate processing system 156, and other items 158. Unload rate processing system 156 can include fill height generator 160, current fill percent generator 162, cutoff threshold comparison system 164, taper threshold comparison system 166, taper value generator 168, unload rate command generator 170, and other items 172. Controllable subsystems 150 can include gate actuator 174, conveyor (auger) actuator 176, propulsion and steering subsystems 178, and other items 180.

Before describing the operation of material transfer vehicle 106 in more detail, a description of some items in material transfer vehicle, and their operation, will first be provided. Unload control parameters 134 can be the configurable parameters, such as the taper threshold, the cutoff threshold, the rate of taper, the desired fill height, among other things.

Communication system 138 enables communication of the items of material transfer vehicle 106 with one another, and may enable communication with other remote systems as well. Therefore, communication system 138 can include a controller area network (CAN) bus and bus controller, a cellular communication system, a near field communication system, a Wi-Fi or Bluetooth communication system, a wide area network or local area network communication system, and/or any of a wide variety of other communication systems or combination of systems that enable communication over various networks or combinations of networks.

Fill height sensor 115 can include an image sensor, along with an image processing system that processes captured images to identify items in the captured images. Thus, fill height sensor 115 can be a mono or stereo camera, a video camera, a RADAR sensor, a LIDAR sensor, an ultrasound sensor, etc. Sensors 140 can include a wide variety of other sensors 142, such as a position sensor (e.g., a GNSS receiver), a fill rate sensor that senses the rate at which material is being transferred by auger 114, a weight sensor that senses the weight of material in grain cart 110, a mass flow sensor that senses the mass flow of material through auger 114, and any of a wide variety of other sensors.

Operator interface system 144 includes operator interface mechanisms that can generate or act as operator interfaces 182 for interaction by one or more operators 184. The operator interface mechanisms in system 144 can include levers, a steering wheel, joysticks, pedals, linkages, buttons, knobs, one or more display devices, speakers, microphones, and/or any of a wide variety of other mechanisms that provide audio, visual, and/or haptic output to operator 184 and/or that receive inputs from operator 184. Operator interfaces 182 may be displays displayed on a display device, and may include operator actuatable mechanisms, such as icons, links, buttons, drop down menus, etc. The operator actuatable mechanisms on operator interfaces 182 may be actuated by using a point and click device, touch gestures, keyboard or keypad inputs, voice commands, etc. Unload control system 146 receives one or more inputs from sensors 140 and determines the fill level of material in the container or semi-trailer 120 and generates an unload rate command 186 based upon the fill level. Thus, as the fill level of material in semi-trailer 120 approaches the desired fill level, the unload rate command can command a tapered unloading rate, as is discussed in more detail elsewhere herein.

Parameter accessing system 154 accesses the unload control parameters 134 either from data store 132, or through operator interface system 144, or elsewhere. Unload rate processing system 156 generates the commanded unload rate 186 based upon the unload control parameters and based on the detected fill level. Fill height generator 160 receives an input from fill height sensor 150 and generates an output indicative of the fill level of material in the container. Current fill percent generator 166 generates a current fill percent output indicating the percent of the desired fill height corresponding to the current fill height. For instance, the current fill height may be 50% of the desired fill height, 85% of the desired fill height, etc.

Cutoff threshold comparison system 164 compares the current fill percent output by current fill percent generator 162 to the cutoff threshold to determine whether the current fill height (or current fill percent) is sufficiently close to the desired fill height so that the unload rate should be commanded to zero. When that occurs, control signal generator 148 generates a control signal to control gate actuator 174 to close gate 111, and/or to control conveyor actuator 176 to stop conveyor 112. However, if cutoff threshold comparison system 164 determines that the current fill percent does not meet the cutoff threshold, then taper threshold comparison system 166 determines whether the current fill percent meets a taper threshold at which point the commanded unload rate begins to taper. When the current fill percent meets the taper threshold, then taper value generator 168 generates an output indicative of the amount by which the commanded unload rate should be tapered, and unload rate command generator 170 generates the unload rate command 186 reflecting a tapered unload rate. Taper value generator 168 may increase the amount by which the unload rate is tapered as the current fill percent comes closer to the desired fill level (or to the cutoff threshold).

Gate actuator 174 may be a hydraulic cylinder, or another type of actuator, such as an electric actuator, a pneumatic actuator, or another type of actuator. Conveyor actuator 176 may be a power takeoff, or another type of motor or actuator. Propulsion and steering subsystem 178 can include a combustion engine, electric motors, one or more motors that drive ground-engaging elements (such as wheels or tracks) either directly or through a transmission, a steering wheel, skid steer functionality, or other subsystems, that control the propulsion and steering of material transfer vehicle 106.

Figure 4A:
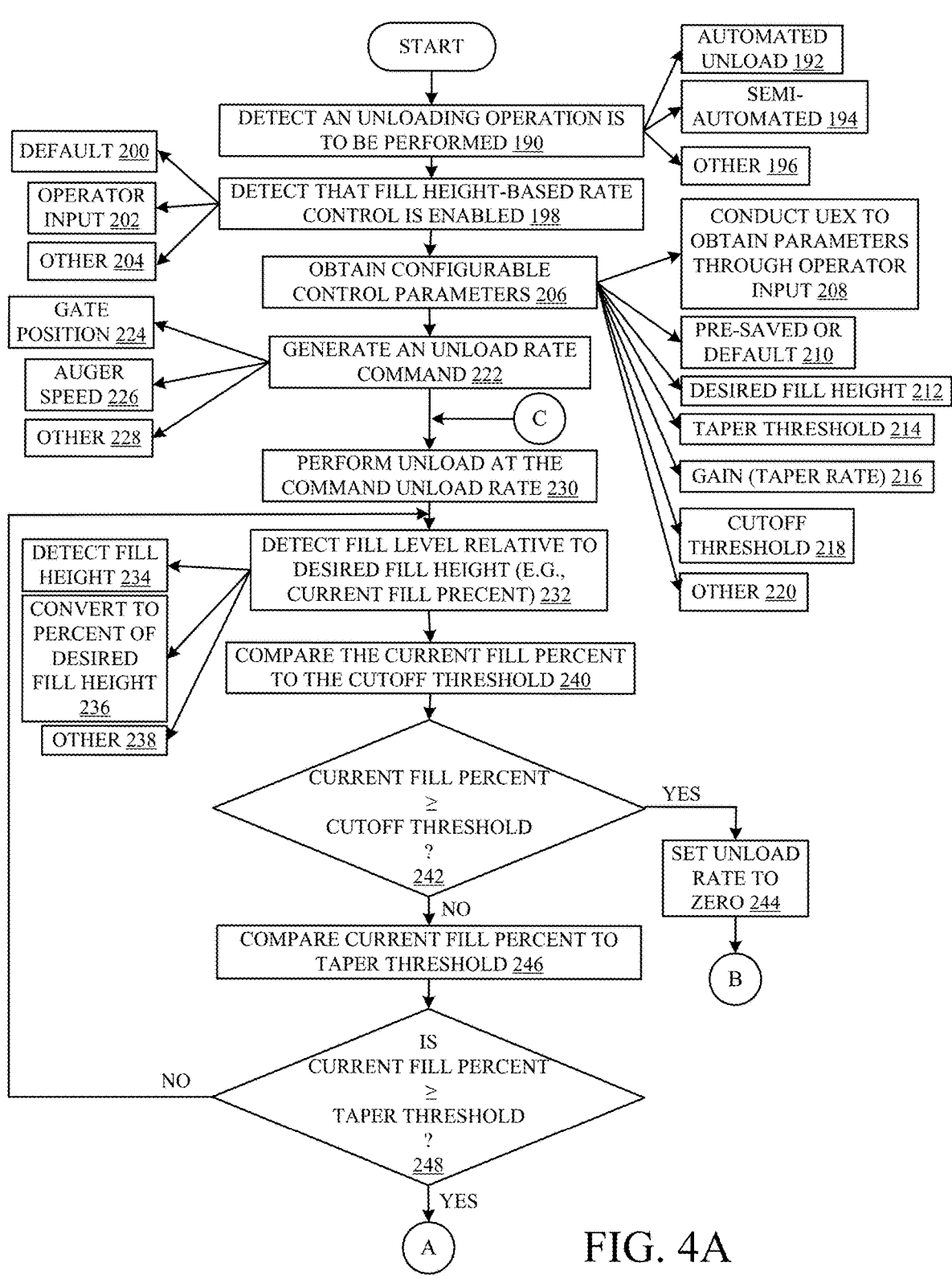
FIGS. 4A and 4B (collectively referred to herein as FIG. 4) show a flow diagram illustrating one example of the operation of an unload control system.
Figure 4B:
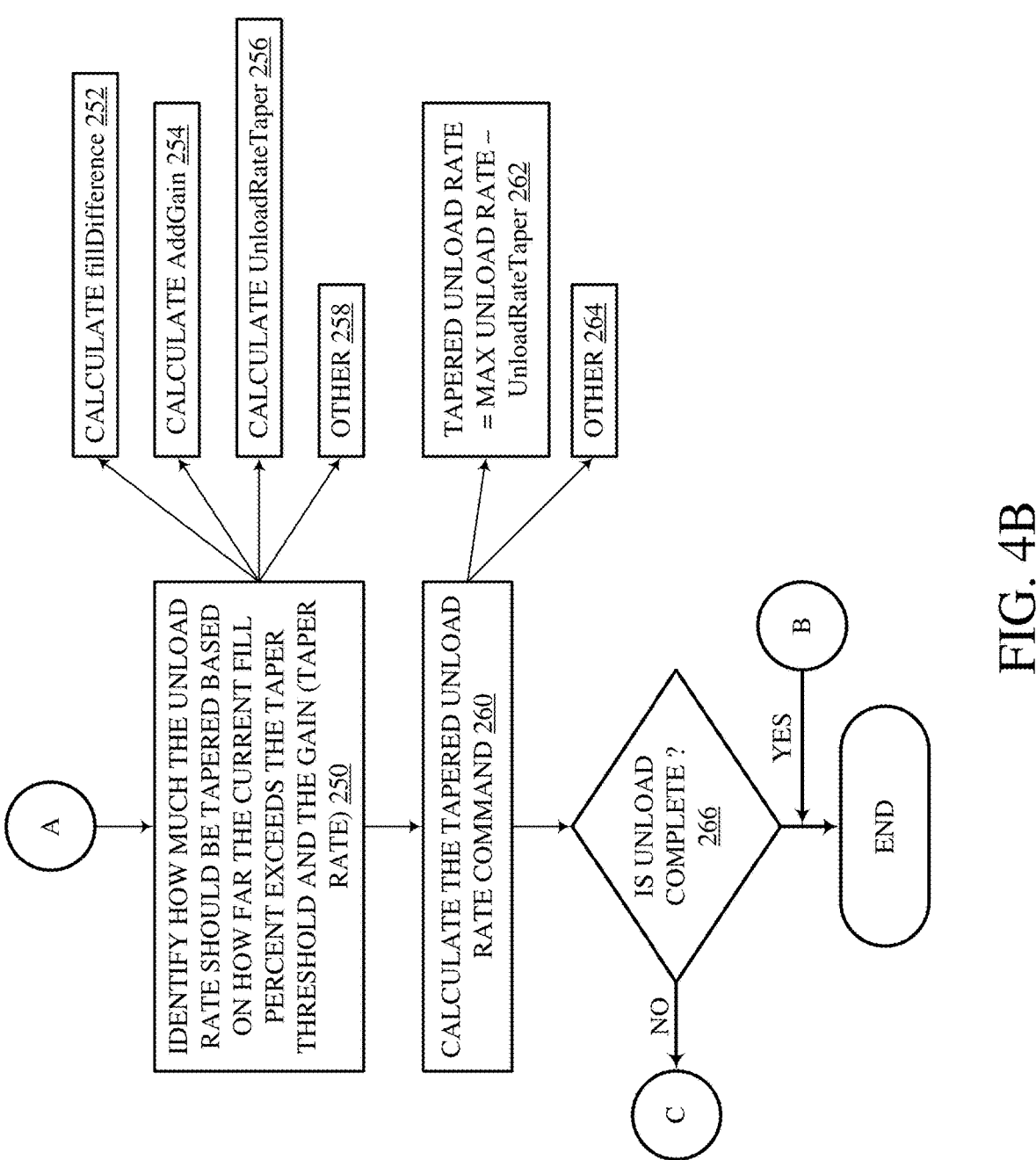

FIGS. 4A and 4B (collectively referred to herein as FIG. 4) show a flow diagram illustrating one example of the operation of material transfer vehicle 106 in sensing the fill level of material in a container (e.g., in semi-trailer 120) and tapering the unload rate based upon the fill level. Unload control system 146 detects that an unloading operation is to be performed, as indicated by block 190 in the flow diagram of FIG. 4. The unloading operation may be commanded automatically so that material transfer vehicle 106 performs an automated unload operation, as indicated by block 192. The unload operation may be a semi-automated operation in which some operations are performed by a manual operator 184 while others are performed by an automated operator, or a control system. Performing the unload operation in a semi-automated way is indicated by block 184 in the flow diagram of FIG. 4. Detecting that an unloading operation is to be performed can be done in other ways as well, as indicated by block 196.

Unload rate processing system 156 detects that the height-based rate control performed by unload control system 146 has been enabled, as indicated by block 198. Height-based rate control can be enabled by default, as indicated by block 200, based on an operator input from operator 184, as indicated by block 202, or in other ways, as indicated by block 204.

Parameter accessing system 154 obtains the configurable unload control parameters 134, as indicate by block 206 in the flow diagram of FIG. 4. In one example, parameter accessing system 154 controls operator interface system 144 to conduct a user experience that prompts operator 184 for the configurable control parameters 134. Obtaining the parameters 134 by conducting a user experience is indicated by block 208 in the flow diagram of FIG. 4. In another example, parameter accessing system 154 can access the configurable unload control parameters 134 from memory where the parameters may be pre-saved, or the parameters may be default parameters, as indicated by block 210. The unload control parameters may include such things as the desired fill height or target fill height in the container, as indicated by block 212, the taper fill height threshold 214 which defines a fill height at which the unload rate tapering begins, the gain (or taper rate) 216 which defines the rate at which the unload rate is tapered, the cutoff threshold 218 which indicates the fill level at which the unload rate is commanded to zero, and any of a wide variety of other parameters 220.

Unload rate command generator 170 generates an unload rate command 186 to command controllable subsystems 150 to perform the unloading operation at the commanded unload rate. Generating an unload rate command is indicated by block 222 in the flow diagram of FIG. 4. The unload rate command can be used by control signal generator 148 to generate a gate position control signal 224 that can be used to control gate actuator 174 to move gate 111 to a desired position (e.g., to a fully opened position, a partially opened position, etc.). The unload rate command 186 can also be used by control signal generator 148 to generate a control signal to control the conveyor (e.g., auger) actuator 176 in order to control the speed at which conveyor 112 conveys material. For instance, where the conveyor actuator 176 is a power takeoff driven by tractor 108, then the speed of the conveyor may be controlled by controlling the engine speed, or another controllable subsystem. Controlling the auger or conveyor speed based on the unload rate command 186 is indicated by block 226 in the flow diagram of FIG. 4. Control signal generator 148 can generate other control signals based upon the unload rate command 186 as well, as indicated by block 228 in the flow diagram of FIG. 4.

The controllable subsystems 150 then perform the unload operation at the commanded unload rate, based upon the control signals generated by control signal generator 148. Performing the unload operation at the commanded unload rate is indicated by block 230 in the flow diagram of FIG. 4. Unload rate processing system 156 then detects the fill level of material in semi-trailer 120 relative to the desired fill height as indicated by block 232. For instance, fill height generator 160 processes the images captured by fill height sensor 115 to identify the height of material in semi-trailer 120. Detecting the fill level as a fill height is indicated by block 234 in the flow diagram of FIG. 4.

Current fill percent generator 162 can then convert the detected fill height into a percent of the desired fill height, as indicated by block 236. Equation 1 sets out one example of how the current fill height can be converted to a current fill percent (e.g., the percent of the desired fill height):

$$\text{Current Fill Percent} = \frac{\text{Current Fill Height}}{\text{Desired Fill Height}} * 100\% \qquad \text{Equation 1}$$

The fill level can be detected in other ways as well, as indicated by block 238.

Cutoff threshold comparison system 164 then compares the current fill percent to the cutoff threshold, as indicated by block 240. For instance, if the current fill percent meets the cutoff threshold, then this indicates that the fill height in semi-trailer 120 is close enough to the desired fill height that the controllable subsystems 150 should stop unloading material into semi-trailer 120. If the current fill percent meets the cutoff threshold, as determined at block 242, then cutoff threshold comparison system 164 generates an output indicative of this to unload rate command generator 170. Unload rate command generator 170 then generates an unload rate command 186 commanding the unload rate to zero, as indicated by block 244 in the flow diagram of FIG. 4.

However, if, at block 242, cutoff threshold comparison system 164 determines that the current fill percent does not meet the cutoff threshold, then taper threshold comparison system 166 compares the current fill percent to the taper threshold (the threshold at which the unload rate should begin to be tapered) as indicated by block 246 in the flow diagram of FIG. 4. If taper threshold comparison system 166 determines that the current fill percent does not meet the taper threshold, as determined at block 248 in the flow diagram of FIG. 4, then processing reverts to block 232 where fill height generator 160 continues to detect the fill level of material in semi-trailer 120.

However, if, at block 248, taper threshold comparison system 166 determines that the current fill percent does meet the taper threshold, then taper value generator 168 identifies the amount by which the unload rate should be tapered based upon the amount by which the current fill percent exceeds the taper threshold and based upon the gain (or taper rate) retrieved as one of the unload control parameters 134. Determining the amount by which the unload rate should be tapered based upon the current fill percent, the taper threshold, and the taper rate is indicated by block 250 in the flow diagram of FIG. 4. In one example, as set out in Equation 2 below, taper value generator 168 first calculates the difference between the current fill percent and the taper threshold:

8

$$\text{fillDifference} = \frac{\text{Current Fill Percent} - \text{Taper Threshold}}{100} \qquad \text{Equation 2}$$

Calculating the fillDifference is indicated by block 252 in the flow diagram of FIG. 4. Taper value generator 168 then calculates an AddGain value based upon the maximum unload rate and the gain value, as set out in Equation 3 below:

$$\text{AddGain} = \frac{\text{Max Unload Rate}}{\text{Gain Value}} \qquad \text{Equation 3}$$

Taper value generator 168 then calculates the amount by which the unload rate is to be tapered based upon the fillDifference, the gain value, and the AddGain value, as set out in Equation 4 below:

$$\text{UnloadRateTaper} = \text{fillDifference} * \text{GainValue} * \text{AddGain} \qquad \text{Equation 4}$$

Calculating the AddGain value is indicated by block 254 in the flow diagram of FIG. 4 and calculating the Unload-RateTaper value is indicated by block 256. Taper value generator 168 can calculate other values as well, as indicated by block 258.

Once the amount by which the unload rate is to be tapered has been calculated as set out in Equation 4 above, unload rate command generator 178 calculates the tapered unload rate command as set out in Equation 5 below:

$$\text{TaperedUnloadRateCommand} = \qquad \text{Equation 5}$$
$$\text{MaxUnloadRate} - \text{UnloadRateTaper}$$

Calculating the tapered unload rate command is indicated by block 260 in the flow diagram of FIG. 4. Calculating the tapered unload rate command as set out in Equation 5 is indicated by block 262. The tapered unload rate command can be calculated in other ways as well, as indicated by block 264. Until the unload operation is complete, as determined at block 266 in the flow diagram of FIG. 4, processing reverts to block 230 where the unload control system 146 and control signal generator 148 continue to perform the unload operation based upon the unload rate command 186.

An example may be helpful.

Assume that the fill height-based rate control is enabled and that the maximum unload rate is 600 bushels per minute. Assume further that the desired fill height is 0 cm (meaning that the material should be filled to the upper edge of the container or semi-trailer 120). Also, assume that the taper threshold is 80% (meaning that the unload rate should begin to be tapered when the fill height reaches 80% of the desired fill height), and the cutoff threshold is 95% (meaning that when the fill height in the container reaches 95% of the desired fill height, then the unload rate should be commanded to zero). Assume further that the taper gain value is set to 10. Thus, once the current fill percent is above the taper threshold, then the commanded unload rate will begin tapering off. Until that time, the unload rate command is set to maximum (e.g., 600 bushels per minute). Assume now that the fill height generator 160 and current fill percent generator 162 determine that the current fill height of material in semi-trailer 120 is at 85% of the desired fill height. Then, according to Equation 1 above:

$$fillDifference = \frac{85-80}{100} = 0.05 \qquad \text{Equation 6}$$

Then based on Equation 3 above:

$$AddGain = \frac{600}{10} = 60 \qquad \text{Equation 7}$$

Taper value generator 168 then generates the amount by which the unload rate is to be tapered according to Equation 4 above, and as follows:

$$UnloadRateTaper = 0.05 * 10 * 60 = 30 \qquad \text{Equation 8}$$

Unload rate command generator 170 then generates the tapered unload rate command as set out in Equation 5 above, and as follows:

$$TaperedUnloadRate = 600 - 30 = 570 \frac{bu}{min} \qquad \text{Equation 9}$$

Further, once the system detects that the current fill percent is at 95% of the desired fill percent, then the unload rate will be commanded to zero.

It can thus be seen that the present description describes a system that determines when the fill level of material in a container is approaching the desired fill level, at which point the unload rate is tapered so that the material transfer vehicle can move to a new position along the container. At that point, the fill level at the new position will drop so that the commanded fill rate will again be increased. This continues as the material transfer vehicle moves along the container until either the container is full (and the cutoff fill level threshold is reached) or until the material transfer vehicle is empty. This greatly increases the accuracy of the unloading operations, reduces spillage, and thus enhances efficiency.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays the mechanisms has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, generator, sensors, and/or logic. It will be appreciated that such systems, components, generator, sensors, and/or logic can be comprised of hardware items (such as processors and associated memory, or other processing components, some of which are described below) that perform the functions associated with those systems, components, generator, sensors, and/or logic. In addition, the systems, components, generator, sensors, and/or logic can be comprised of software that is loaded into a memory and is subsequently executed by a processor or server, or other computing component, as described below. The systems, components, generator, sensors, and/or logic can also be comprised of different combinations of hardware, software, firmware, etc., some examples of which are described below. These are only some examples of different structures that can be used to form the systems, components, generator, sensors, and/or logic described above. Other structures can be used as well.

Figure 5:
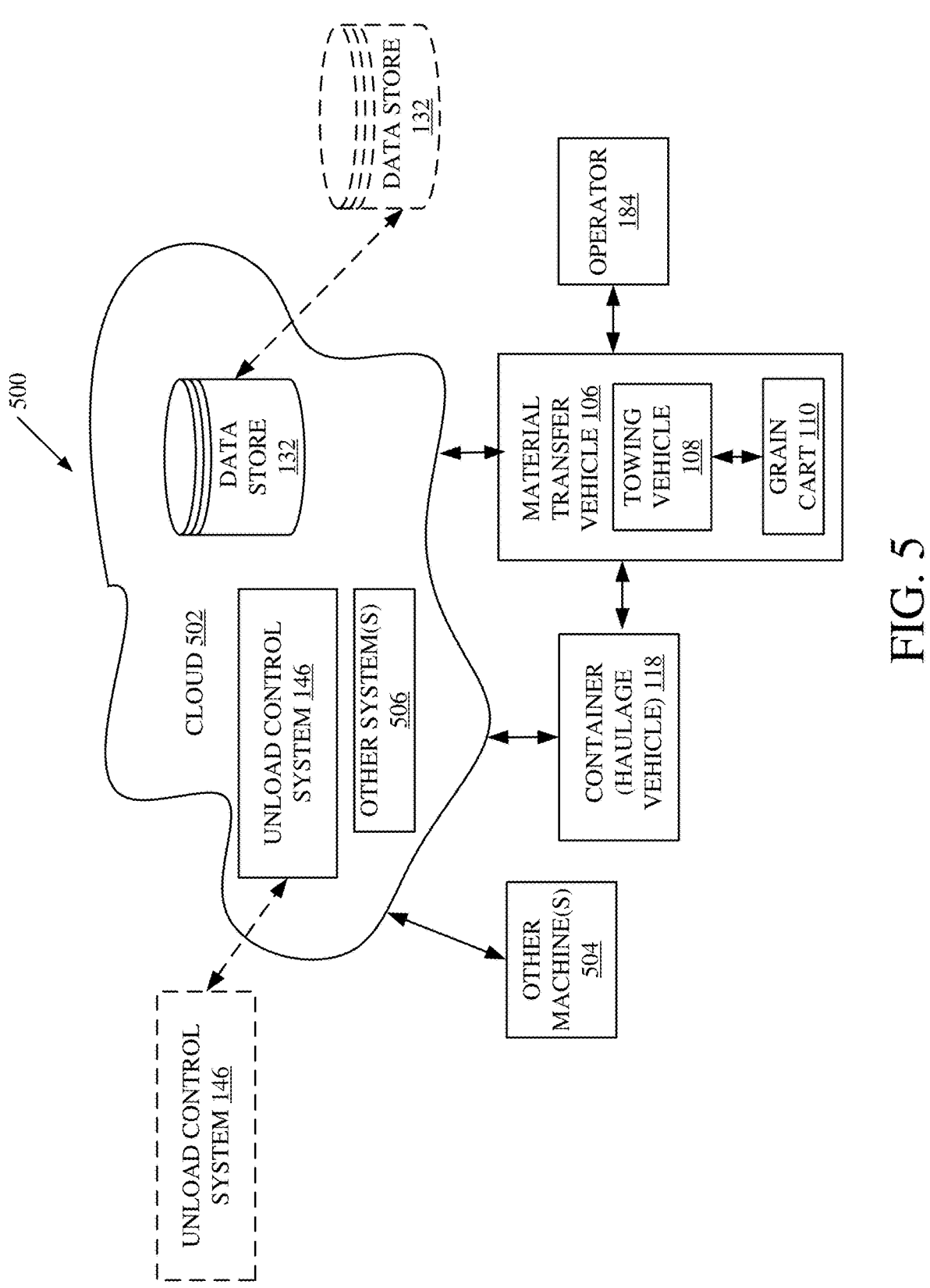
FIG. 5 is a block diagram showing one example of an agricultural system deployed in a remote server environment.

FIG. 5 is a block diagram of agricultural system 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in previous FIGS. and they are similarly numbered. FIG. 5 specifically shows that unload control system 146 and/or data store 132 can be located at a remote server location 502. Therefore, vehicle 106 accesses those systems through remote server location 502.

FIG. 5 also depicts another example of a remote server architecture. FIG. 5 shows that it is also contemplated that some elements of previous FIGS are disposed at remote server location 502 while others are not. By way of example, data store 132 and/or unload control system 146 can be disposed at a location separate from location 502, and accessed through the remote server at location 502. Regardless of where the items are located, they can be accessed directly by material transfer vehicle 106, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. All of these architectures are contemplated herein.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
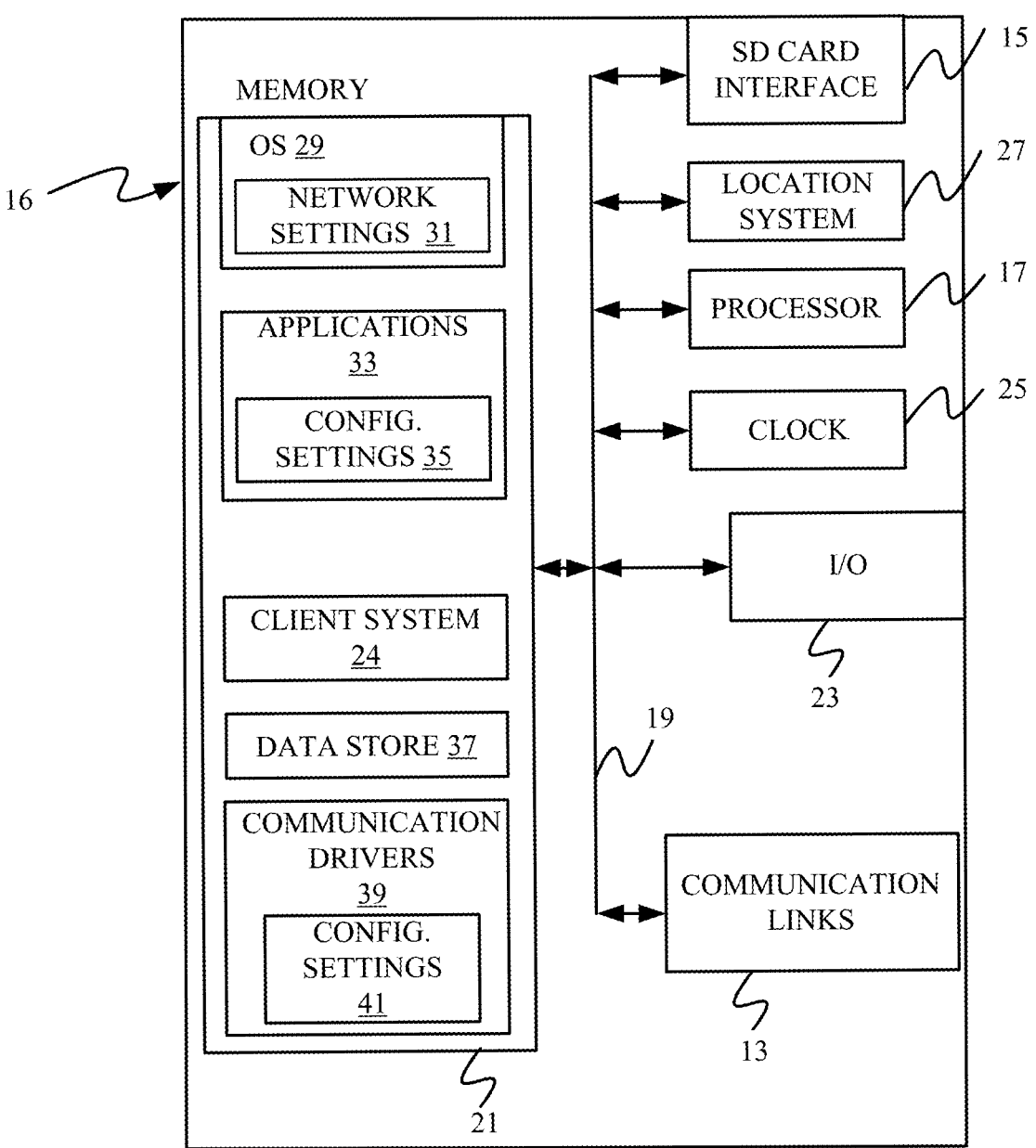
FIGS. 6, 7, and 8 show examples of mobile devices that can be used in the systems and architectures shown in other figures.
Figure 7:
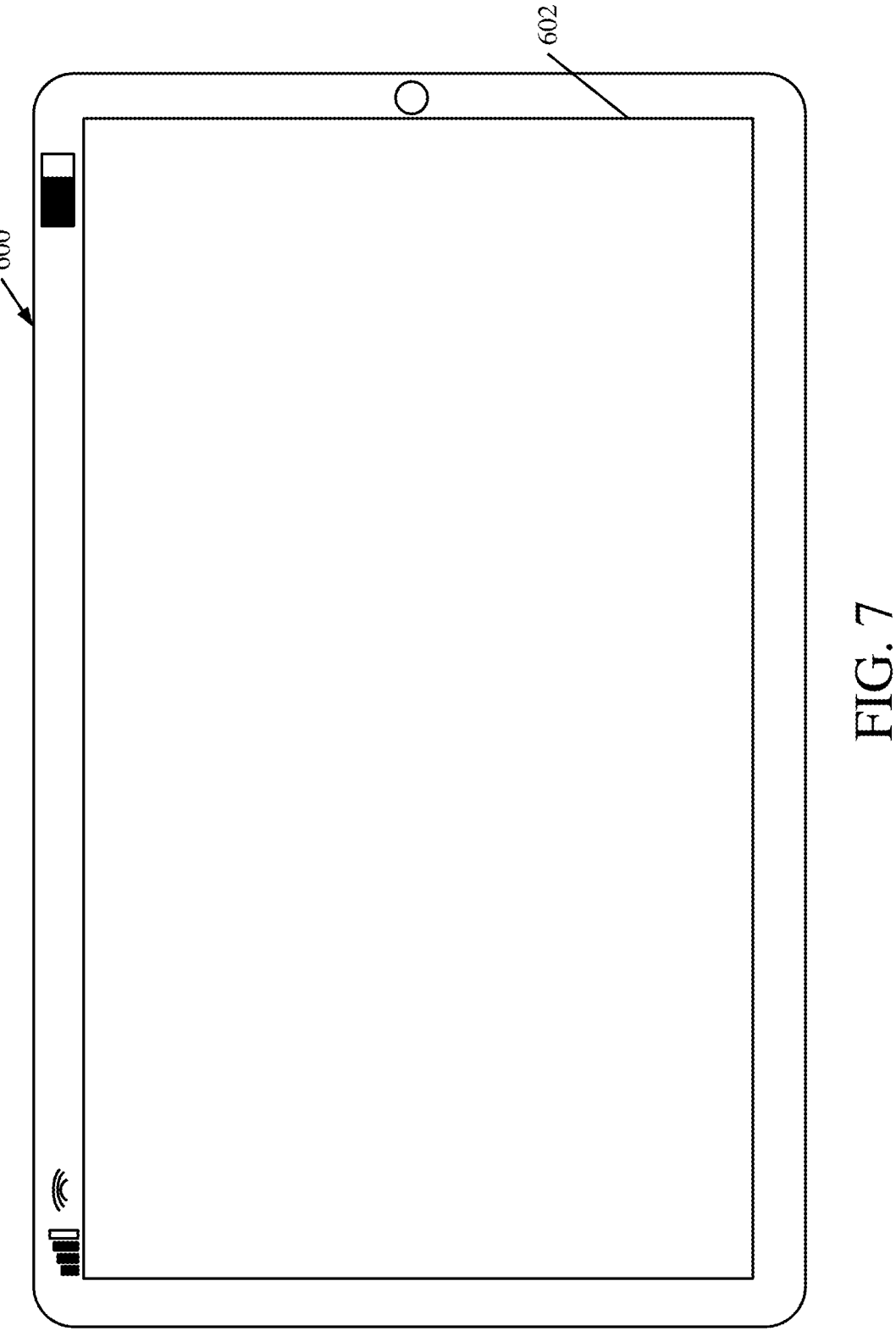
Figure 8:
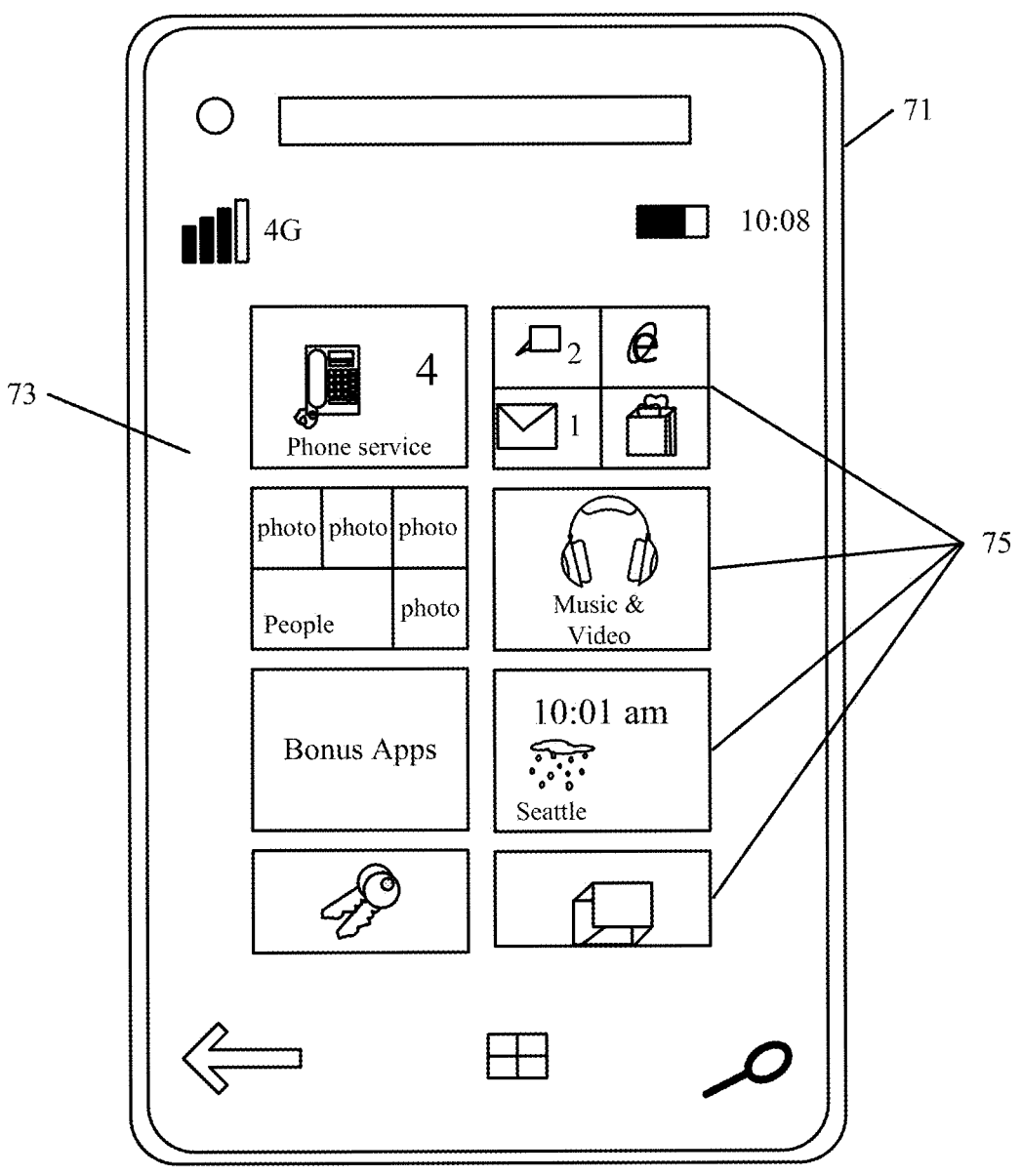
Figure 9:
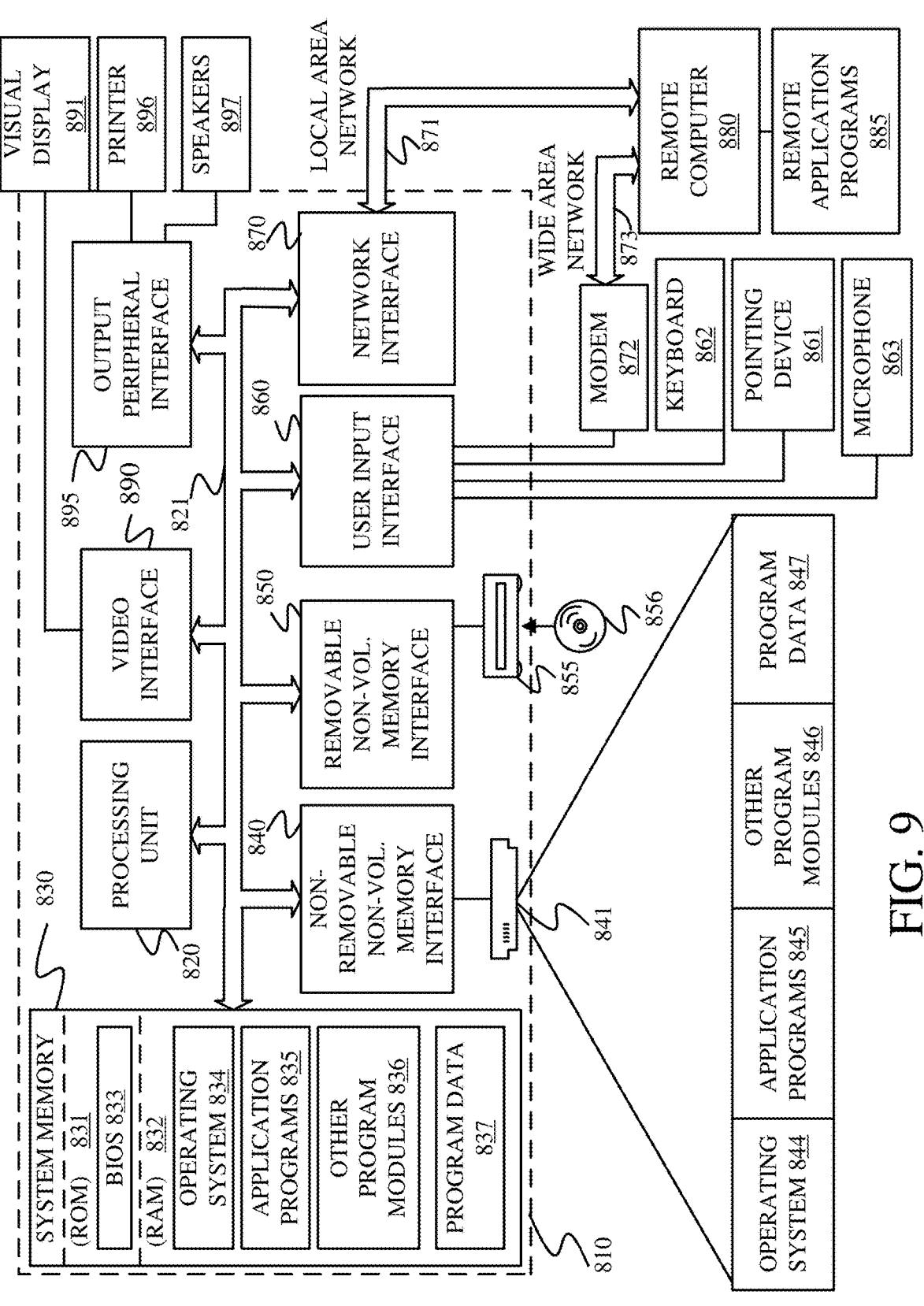
FIG. 9 is a block diagram showing one example of a computing environment that can be used in the systems and architectures shown in other figures.

FIG. 6 is a simplified block diagram of one illustrative example of a handheld or mobile computing device that can be used as a user's or client's hand held device 16, in which the present system (or parts of it) can be deployed. For instance, a mobile device can be deployed in the operator compartment of material transfer vehicle 106 for use in generating, processing, or displaying the fill height, transfer rate, etc. FIGS. 7-9 are examples of handheld or mobile devices.

FIG. 6 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which elements of previous FIGS., or parts of it, (for example) can be deployed. With reference to FIG. 9, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media May embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network-LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
   accessing a configurable unloading operation parameter, wherein accessing the configurable unloading operation parameter comprises:
     accessing a cutoff threshold fill level; and
     accessing a taper threshold fill level;
   detecting a fill level of material unloaded into a container by a material transfer vehicle;
   generating an unloading rate command based on the configurable unloading operation parameter and the fill level, wherein generating the unloading rate command comprises:
     comparing the fill level to the cutoff threshold fill level to generate a cutoff threshold comparison result; and
     when the cutoff threshold comparison result indicates that the fill level meets the cutoff threshold fill level, generating the unloading rate command to stop an unloading operation based on the cutoff threshold comparison result; and
   generating an unloading control signal to control an unloading subsystem based on the unloading rate command.

2. The computer implemented method of claim 1 wherein generating an unloading rate command comprises:
   comparing the fill level to the taper threshold fill level to obtain a taper threshold comparison result; and
   when the taper threshold comparison result indicates that the fill level meets the taper threshold fill level, then generating a tapered unloading rate command.

3. The computer implemented method of claim 2 wherein accessing a configurable unloading operation parameter comprises:
   accessing a taper rate parameter indicative of a rate at which the unloading rate command is tapered to obtain the tapered unloading rate command.

4. The computer implemented method of claim 3 wherein comparing the fill level to the taper threshold fill level comprises:
   computing a difference between the fill level and the taper threshold fill level.

5. The computer implemented method of claim 4 wherein generating the tapered unloading rate command comprises:
   computing a taper value based on the difference between the fill level and the taper threshold fill level; and generating the tapered unloading rate command based on the taper value.

6. The computer implemented method of claim 5 wherein accessing a configurable unloading operation parameter comprises accessing a target fill height of material in the container, and wherein detecting the fill level comprises:

detecting a fill height of the material unloaded into the container; and computing, as the fill level, a current fill percent based on the detected fill height and the target fill height.

7. The computer implemented method of claim 1 wherein accessing a configurable unloading operation parameter comprises:

controlling a user interface system to generate a user interface with a user input actuator; and detecting a user interaction with the user input actuator to receive the configurable unloading operation parameter.

8. The computer implemented method of claim 1 wherein accessing a configurable unloading operation parameter comprises:

accessing a data store to obtain the configurable unloading operation parameter.

9. An unload control system configured to control a material transfer vehicle to perform an unloading operation, the unload control system comprising:

a parameter accessing system configured to access a configurable unloading operation parameter, wherein the configurable unloading operation parameter comprises a taper threshold fill level;

a fill level generator configured to identify a fill level of material unloaded into a container by the material transfer vehicle;

an unload rate processing system configured to generate an unloading rate command based on the configurable unloading operation parameter and the fill level, wherein the unload rate processing system comprises:

a cutoff threshold comparison system configured to obtain a cutoff threshold fill level, compare the fill level to the cutoff threshold fill level to generate a cutoff threshold comparison result and, when the cutoff threshold comparison result indicates that the fill level meets the cutoff threshold fill level, generate the unloading rate command to stop the unloading operation based on the cutoff threshold comparison result, and a taper threshold comparison system configured to compare the fill level to the taper threshold fill level to obtain a taper threshold comparison result and, when the taper threshold comparison result indicates that the fill level meets the taper threshold fill level, generate a tapered unloading rate command; and a control signal generator configured to generate an unloading control signal to control an unloading subsystem based on the unloading rate command.

10. The unload control system of claim 9 wherein the unload rate processing system comprises:

a taper value generator configured to obtain a taper rate parameter, indicative of a rate at which the unloading rate command is tapered to obtain the tapered unloading rate command, and generate a taper value based on the taper rate parameter.

11. The unload control system of claim 10 wherein the configurable unloading operation parameter comprises a target fill height and wherein the fill level generator comprises:

a fill height generator configured to detect a fill height of the material unloaded into the container; and a current fill percent generator configured to compute, as the fill level, a current fill percent based on the detected fill height and the target fill height.

12. The unload control system of claim 11 wherein the taper threshold fill level comprises a taper threshold fill percent and wherein the taper value generator is configured to compute a difference between the current fill percent and the taper threshold fill percent and compute the taper value based on the difference between the current fill percent and the taper threshold fill percent and wherein the control signal generator is configured to generate the tapered unloading rate command based on the taper value.

13. The unload control system of claim 9 and further comprising:

a user interface system configured to generate a user interface with a user input actuator, wherein the parameter accessing system is configured to detect a user interaction with the user input actuator to receive the configurable unloading operation parameter.

14. A computer system, comprising:

at least one processor; and a data store, storing computer executable instructions which, when executed by the at least one processor, cause the at least one processor to perform steps, comprising:

accessing a configurable unloading operation parameter;

detecting a fill level of material unloaded into a container by a material transfer vehicle;

generating an unloading rate command, based on the configurable unloading operation parameter and the fill level, to taper an unload rate at which material is transferred from the material transfer vehicle to the container, after the fill level of the material in the container reaches a taper threshold fill level, and as the fill level of the material in the container approaches a desired fill level; and generating an unloading control signal to control an unloading subsystem based on the unloading rate command.

15. The computer system of claim 14, wherein generating the unloading rate command comprises:

comparing the fill level to the taper threshold fill level to obtain a taper threshold comparison result; and when the taper threshold comparison result indicates that the fill level meets the taper threshold fill level, then generating a tapered unloading rate command.

16. The computer system of claim 15, wherein accessing the configurable unloading operation parameter comprises:

accessing a taper rate parameter indicative of a rate at which the unloading rate command is tapered to obtain the tapered unloading rate command.

17. The computer system of claim 16, wherein comparing the fill level to the taper threshold fill level comprises:

computing a difference between the fill level and the taper threshold fill level.

18. The computer system of claim 17, wherein generating the tapered unloading rate command comprises:

computing a taper value based on the difference between the fill level and the taper threshold fill level; and generating the tapered unloading rate command based on the taper value.

19. The computer system of claim 18, wherein accessing the configurable unloading operation parameter comprises accessing a target fill height of material in the container, and wherein detecting the fill level comprises:

detecting a fill height of the material unloaded into the container; and computing, as the fill level, a current fill percent based on the detected fill height and the target fill height.

20. The computer system of claim 14, wherein accessing the configurable unloading operation parameter comprises:

controlling a user interface system to generate a user interface with a user input actuator; and detecting a user interaction with the user input actuator to receive the configurable unloading operation parameter.

\* \* \* \* \*